United States Patent

[11] 3,622,694

[72] Inventor Thomas P. L. Liu
Liverpool, N.Y.
[21] Appl. No. 18,963
[22] Filed Mar. 12, 1970
[45] Patented Nov. 23, 1971
[73] Assignee General Electric Company

[54] VIDEO SIGNAL PROCESSOR FOR A LIGHT VALVE
5 Claims, 9 Drawing Figs.

[52] U.S. Cl. .................................................... 178/5.4 BD
[51] Int. Cl. .................................................... H04n 9/12
[50] Field of Search .................................................... 178/5.4, 5.4 BD, 7.3 D, 7.3 DC, 7.5 D, 7.5 DC

[56] References Cited

UNITED STATES PATENTS 3,272,917 9/1966 Good et al. .................. 178/5.4 BD
3,315,033 4/1967 Sennhenn et al. ............ 178/7.3 DC

*Primary Examiner*—Richard Murray
*Attorneys*—Marvin Snyder, W. J. Shanley, Jr., Frank L. Neuhauser, Oscar B. Waddell and James B. Forman

ABSTRACT: Conversion of a conventional video signal at a receiver into a signal capable of controlling formation of optical diffraction gratings with a stable black level in a light valve is accomplished by clamping the video signal to a reference amplitude level and clipping the portion of video signal below the video black level. The clipped video signal is then clamped to a dark field reference voltage representing the black portions of the image being projected. The clipped video signal thus clamped is amplitude modulated onto a radio frequency carrier which is applied to electron beam deflection apparatus of the light valve.

INVENTOR:
THOMAS P.L. LIU,
BY Marvin Snyder
HIS ATTORNEY.

INVENTOR:
THOMAS P. L. LIU,
BY Marvin Snyder
HIS ATTORNEY.

VIDEO SIGNAL PROCESSOR FOR A LIGHT VALVE

INTRODUCTION

This invention relates to video-signal-processing apparatus and more particularly to apparatus for converting a conventional video signal into a signal with a stable black level for operating a light valve. A light valve suitable for optical projection of electronically generated images onto a remote display surface comprises, in a preferred embodiment, an evacuated enclosure containing an electron gun in predetermined alignment with a transparent disc. The disc is rotated through a reservoir of light-modulating fluid to deposit a continuously replenished layer of fluid on the disc surface. An electron beam, generated by the electron gun, is scanned across a portion of the light-modulating fluid layer by electron beam-deflecting means, so as to selectively deform the layer. The fluid deformations thus formed constitute optical diffraction gratings which, in conjunction with a Schlieren optical system, selectively control passage of light from a light source through the disc and through an output window in the enclosure envelope in order to create visible images at a remote display surface on which the light impinges.

The aforementioned diffraction gratings are formed by directing the electron beam onto the fluid layer and horizontally deflecting the beam across the surface of the layer in successive, substantially parallel paths. By velocity modulating the beam with signals corresponding to two primary colors, typically red and blue, the speed of horizontal deflection along these paths is varied in a periodic manner at a frequency much greater than the frequency of occurrence of each scan line or parallel path, producing vertically directed diffraction gratings corresponding to the red and blue signals, respectively. In addition, horizontally directed diffraction gratings, corresponding to the green signal, are formed by the horizontal scan lines or parallel paths of the scanning electron beam. The horizontally directed diffraction gratings are wobble modulated; that is, the size of the spot formed by the beam is varied in accordance with green signal modulation. An example of a light valve of this type is described in W. E. Good et al. U.S. Pat. No. 3,325,592, issued June 13, 1967, and assigned to the instant assignee.

In conventional video image display devices, such as cathode ray tubes, output light corresponding to each element of picture information is produced by exciting a phosphor with a high-energy electron beam. If the electron beam is shut off, as occurs when the received video signal is at its cutoff amplitude, the screen becomes dark. This cutoff amplitude constitutes the video signal black level. If the received signal amplitude falls below cutoff, the electron beam remains shut off, so that the screen remains black.

In a light valve, unlike a cathode ray tube, intensity of each element of output light is controlled by diffraction gratings generated by velocity modulating and/or wobble modulating a constant intensity electron beam with an amplitude modulated radio frequency signal. Since the light-modulating fluid is optically transparent, only one amplitude level of radio frequency signal produces a desire black image. Under these conditions, if the radio frequency signal should go either above or below this amplitude level, the image would become brighter; that is, if the received video signal falls below the black level amplitude, the image, which should be black, would instead become bright. Therefore, for light valve projector signal-processing apparatus, not only must a stable black level amplitude of video signal be maintained, but also the black, as well as the blacker-than-black, amplitude level of video signal must produce corresponding black image elements.

Accordingly, one object of the invention is to provide apparatus for maintaining a stable black level for a light valve employing diffraction gratings formed in an optically transparent, light-modulating medium.

Another object is to provide apparatus permitting a light valve to produce black image elements whenever video signal amplitude is at either black level or a blacker-than-black level.

Another object is to provide a light valve video signal processor allowing independent, stable control of image brightness, contrast, dark field, and black video level.

Briefly, in accordance with a preferred embodiment of the invention, a video signal processor for a light valve including electron beam deflecting means comprises, for each chromaticity representative signal, clipping means, a first clamp coupled to the input of the clipping means, and a second clamp coupled to the output of the clipping means. An amplitude reference level is established by the first clamp so as to control the amplitude of clipping, while the second clamp establishes a dark field amplitude reference level. Thus, a chromaticity representative signal, furnished to the first clamp, is clipped at a predetermined level by the clipping means and then clamped to a dark field reference amplitude level by the second clamp. The clipped signal, thus clamped at a minimum voltage equal to the dark field reference level, is amplitude modulated onto a radio frequency signal. The amplitude-modulated signal is split into opposite phases and applied to the electron beam-deflecting means.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
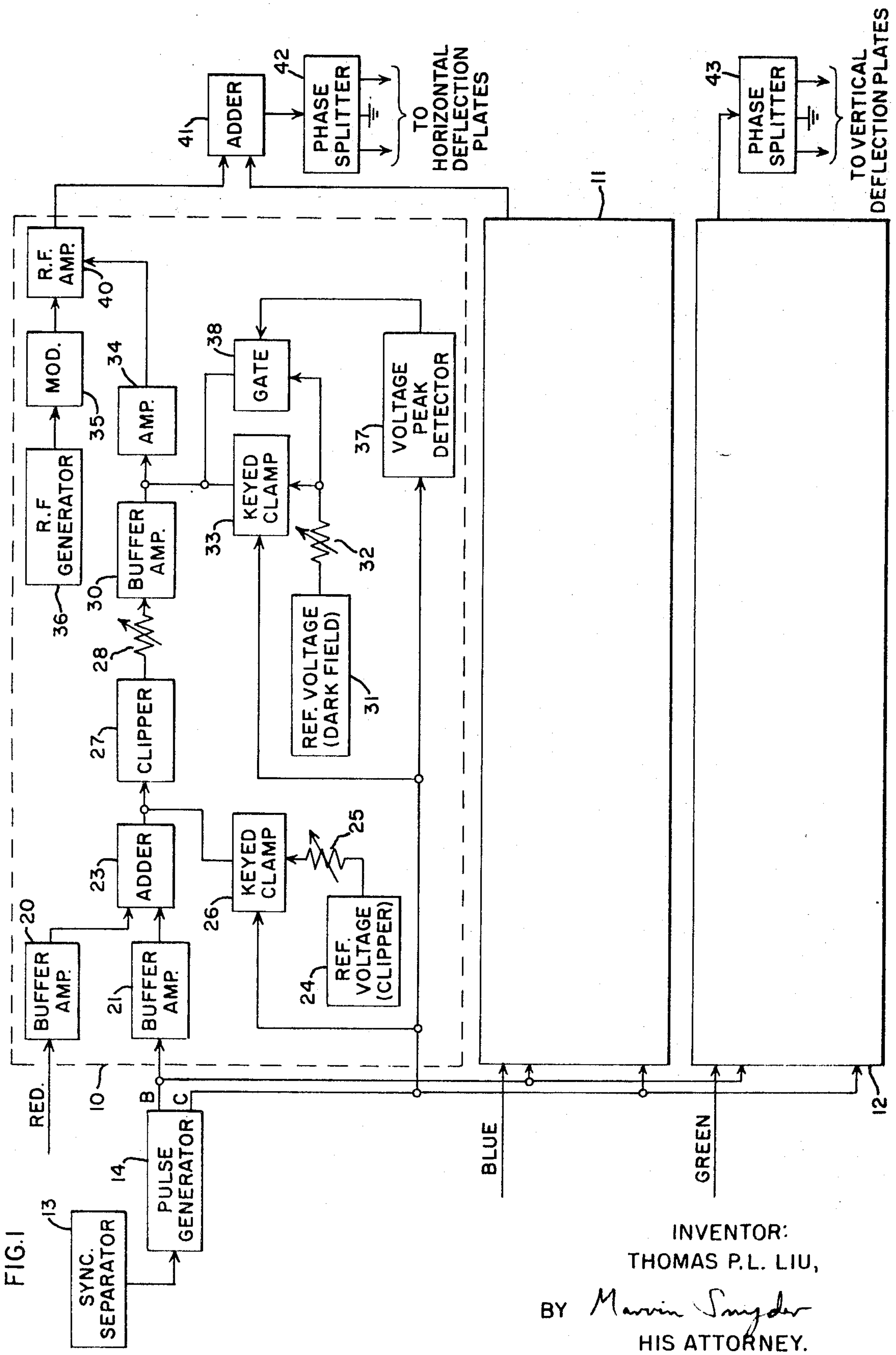
FIG. 1 is a block diagram of a typical embodiment of the invention.

FIG. 1, which illustrates a video signal processor portion of television receiver circuitry, includes a plurality of primary color channels 10, 11 and 12, each channel receiving a video signal representative of colors red, blue and green, respectively. A pulse generator 14, driven by a horizontal sync signal produced by a sync separator 13, supplies brightness pulses B and clamp pulses C to each of the receiver primary color channels 10, 11 and 12. Since each of channels 10, 11 and 12 are essentially identical in circuit configuration, only channel 10 is illustrated in detail.

The primary color video signals are each furnished to a respective buffer amplifier 20 in each of the respective primary color channels. Similarly, the brightness pulse produced by pulse generator 14 is furnished to a respective buffer amplifier 21 in each of the respective primary color channels. In addition, the clamp pulse produced by pulse generator 14 is furnished jointly to a pair of keyed clamp circuits 26 and 33, as well as to a voltage peak detector 37. The amplitude level of clamping for clamp 26 is manually adjusted by a rheostat 25 from a reference voltage source 24, while the amplitude level of clamping for clamp 33 is manually adjusted by a rheostat 32 from a reference voltage source 31.

Output signals from buffer amplifiers 20 and 21 are furnished to an adder circuit 23, and output signals produced by adder 23, which are furnished to a clipper circuit 27, are clamped by claim 26 at a voltage level determined by the setting of rheostat 25. Clipper 27, having removed all portions of its input signal below a predetermined amplitude level, drives a buffer amplifier 30 through a color balance rheostat 28. Rheostat 28 is employed to balance the amplitude of output signal produced by each of color channels 10, 11 and 12.

Output signals produced by buffer amplifier 30 are clamped by clamp 33 at a voltage level determined by the setting of rheostat 32, which sets the zero video dark field for the light valve. A gate 38, connected across the input and output of clamp 33, is maintained in its inhibited or substantially nonconductive condition by output signals from voltage peak detector 37 as long as the detector detects clamp pulses from pulse generator 14. However, in absence of such pulses, the output signal of voltage peak detector 37 falls to a value insufficient to maintain gate 38 inhibited. As a result, the gate switches to its highly conductive condition, effectively short-circuiting clamp 33.

The clamped output signal of buffer amplifier 30 is furnished through an amplifier 34 to a modulating signal input of an amplitude modulator 35. A radio frequency (hereinafter designated RF) generator 36 is coupled to a carrier signal input of amplitude modulator 35. The frequency of RF generator 36, which is constant, is determined by the primary color to be controlled by the channel in which generator 36 is situated; that is, the spatial frequency of diffraction gratings formed in the light valve is directly proportional to the signal frequency produced by generator 36. Typically, the frequency of generator 36 in red channel 10 is 16 MHz, in blue channel 11 is 12 MHz, and in green channel 12 is 48 MHz. Amplitude modulated signals produced by modulator 35 are amplified by an RF amplifier 40 so as to constitute the output signals of the respective channel.

Output signals from red channel 10 and blue channel 11 are each furnished to separate inputs of a two-input adder 41, and the combined signal produced by the adder is supplied to a phase splitter 42, or phase splitting amplifier, which splits the signal into an in-phase component and a 180° out-of-phase component. The in-phase component is supplied to one horizontal electrostatic deflection plate of the light valve, and the out-of-phase component is supplied to the other horizontal electrostatic deflection plate of the light valve (not shown).

Output signals produced by green channel 12 are split into an in-phase component and a 180° out-of-phase component by a phase splitter 43. The in-phase component is supplied to one vertical electrostatic deflection plate of the light valve and the out-of-phase component is supplied to the other vertical electrostatic deflection plate of the light valve (not shown).

Figures 2A, 2B, 2C, 2D, 2E, 2F, 2G, 2H:
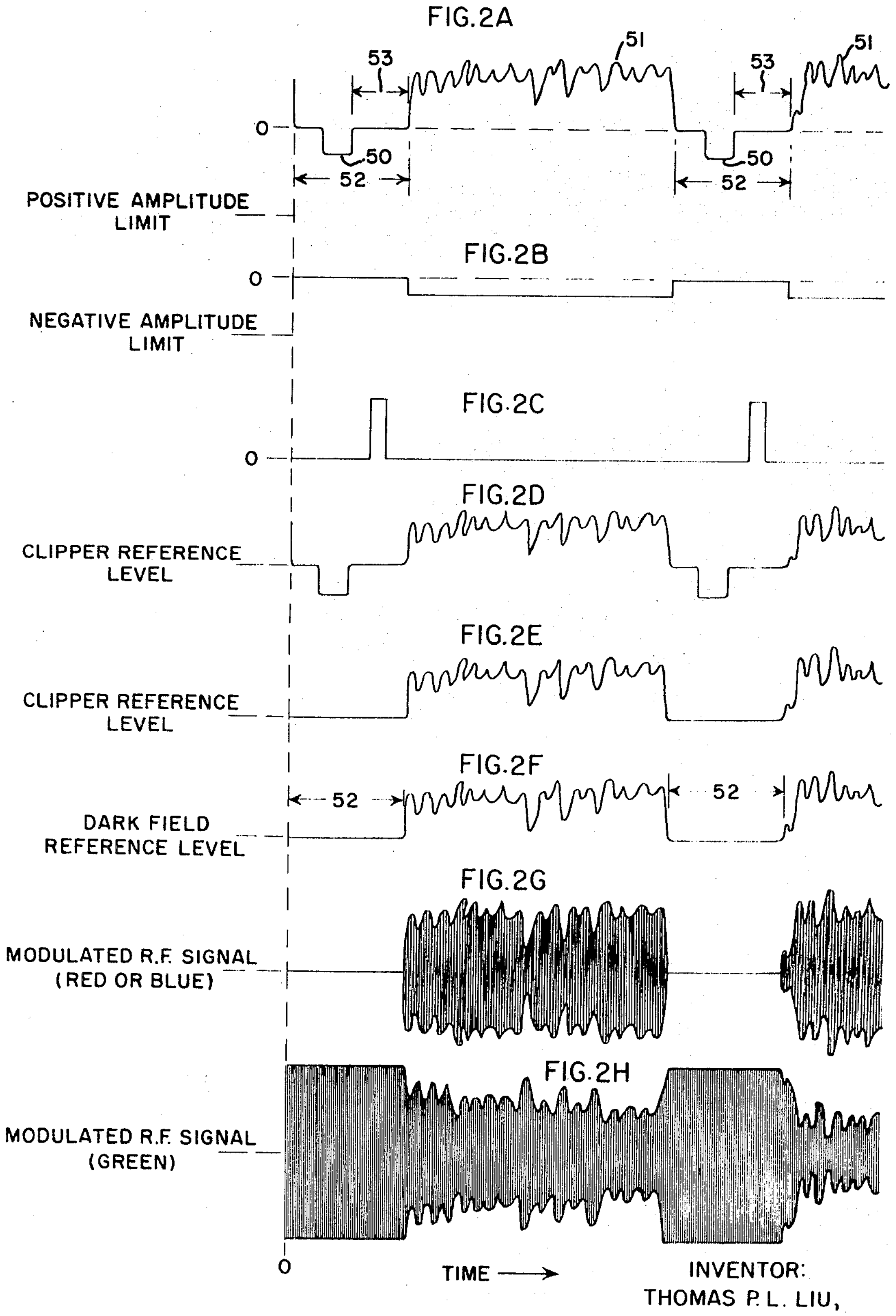
FIGS. 2A–2H are waveforms plotted on a common time abscissa to assist in describing operation of the apparatus of FIG. 1.

In operation, sync separator 13 functions to extract the horizontal sync pulses from the received composite video signal. A typical composite video signal received by the apparatus of FIG. 1 is illustrated by the waveform of FIG. 2A. This waveform includes a negative-going horizontal sync pulse 50 occurring in each horizontal blanking interval 52 between the picture modulation signals 51, plus, for a color signal, the color burst (not shown) which normally occurs in the so-called "back porch" interval 53 of the horizontal sync pulses during the horizontal blanking interval. Only the negative-going horizontal sync pulses 50 are furnished to pulse generator 14 by sync separator 13.

Pulse generator 14 supplies a brightness pulse B, of waveform configuration illustrated in FIG. 2B, to buffer amplifier 21, in each of the respective color channels 10, 11 and 12. This pulse is of amplitude controllable between positive and negative limits by adjustment of pulse generator 14. Additionally, a clamp pulse C, of waveform configuration illustrated in FIG. 2C, is furnished to keyed clamp 26, clamping the output signal of adder 23 to a potential determined by the amplitude of reference voltage 24 and the setting of rheostat 25. Thus, the signal furnished to clipper 27 by adder 23 is of configuration illustrated by the waveform of FIG. 2D, which represents the algebraic sum of the waveforms of FIG. 2A and 2B. The potential to which this signal is clamped constitutes a reference level for clipper 27. The clipped video level establishes the level below which the projected picture must be black. By adding the brightness pulse shown in FIG. 2B to the video signal shown in FIG. 2A, the clipping level is changed and the average amplitude of picture modulation signal 51 is altered. In this fashion, inadvertent obliteration of picture modulation signals due to clipping at an improper level is avoided. Additionally, the brightness pulse can be set to provide optimum contrast in the projected picture for a given input signal; that is, the average amplitude of video signal may be adjusted to permit utilization of the entire transfer characteristic of the deformable medium for display of video information.

As previously indicated, a light valve projector requires, in addition to a stable black level, that the blacker-than-black level of the video signal also produce a corresponding black image element which does not become bright. This is accomplished by clipper 27, which removes all signal of amplitude below the clipper reference level so as to prevent it from modulating the RF carrier signal. The level of clipping may be controlled by controlling the amplitude and polarity of the brightness pulse.

The output signal of clipper circuit 27, represented by the waveform of FIG. 2E, is furnished through color balance rheostat 28 to buffer amplifier 30. Color balance rheostat 28, in each of channels 10, 11 and 12, is adjusted so that when equal amplitude signals are applied to buffer amplifier 20 in each of channels 10, 11 and 12, a purely gray image is displayed by the light valve. Clamp pulse C, furnished to keyed clamp 33, clamps the output signal of buffer amplifier 30 to a potential determined by the amplitude of reference voltage 31 and the setting of rheostat 32. Thus the signal furnished to amplifier 34 by buffer amplifier 30 is of waveform configuration illustrated by FIG. 2F. The portion of signal produced by amplifier 30 during each horizontal blanking interval 52 is clamped by clamp 33 to the voltage amplitude level selected by adjustment of rheostat 32 to cause the light valve to produce a dark field. Since all signal and noise is clipped along the black level in interval 52, as shown in FIG. 2F, any possibility of bright and dark inversion of the red signal is eliminated without requiring any further adjustment of the light valve. Clamping of both the input and output of clipper circuit 27 prevents interaction between the clipper controls, on the input side of clipper 27, and the dark field controls, on the output side of clipper 27. Moreover, this double clamping also minimizes the effects of DC drift in the circuitry.

The output signal of amplifier 34 modulates the RF carrier signal furnished by RF generator 36 to modulator 35, resulting in a signal of waveform as illustrated in FIG. 2G. This signal is furnished through RF amplifier 40 to one input of two-input adder 41. In addition, the second input of adder 41 receives the blue signal furnished from blue channel 11, the waveform of which resembles that illustrated by the waveform of FIG. 2G at least insofar as there is zero signal (i.e. dark field) during horizontal blanking interval 52. The red and blue signals are algebraically added in adder 41 and furnished to phase splitter 42. The two output signals of phase splitter 42, which are 180° out of phase with each other, are added onto sawtooth voltage waves which are of identical configuration but 180° out of phase with each other, respectively, produced by a sawtooth voltage wave source (not shown), and the composite signals, which are 180° out of phase with each other, are applied to the horizontal deflection plates of a light valve of the type shown and described in the aforementioned W.E. Good et al. U.S. Pat. No. 3,325,592. In this manner, the electron beam of the light valve is velocity modulated in a horizontal direction in accordance with the red and blue color signals, producing vertically directed red and blue diffraction gratings on the deformable medium of the light valve.

If, in any color channel, such as channel 10 for example, clamp pulses temporarily are not received from pulse generator 14, the output signal of buffer amplifier 30 may acquire a drifting DC level This drifting DC level may rise sufficiently high as to cause damage to modulator circuit 35. However, loss of the clamp pulses is detected by voltage peak detector 37, which causes gate 38 to switch to its conductive condition. As a result, the output signal of buffer amplifier 30 is steadily maintained at the potential to which clamp 33 normally clamps the output signal of amplifier 30 during each horizontal blanking interval. This potential is of a low enough amplitude level to avoid any damage to modulator 35. When clamp pulses from pulse generator 14 again resume, gate 38 is again switched into its inhibited condition, permitting proper operation of the color channel.

Green color channel 12 is essentially identical in circuit configuration to that of channels 10 and 11, with the exception that the modulator therein operates in a different mode than the modulator in each of channels 10 and 11. Effectively modulator 35 of channel 12 inverts the signal received from amplifier 34, so that the RF signal produced by generator 36 is modulated with the inverse amplitude of the output signal of amplifier 34. Thus, while the modulators of channels 10 and 11 operate in a positive modulation mode so as to provide no RF signal at their outputs in absence of any modulating signals, the modulator of channel 12 operates in a negative modulation mode so as to provide maximum RF output signal (i.e. dark field) in absence of any modulating signal, and only in the presence of a modulating signal is the amplitude of RF signal in channel 12 reduced. This is illustrated in FIG. 2H. Hence the amplitude of output signal produced by the modulator of green channel 12 varies inversely with amplitude of the green video signal, while the amplitude of output signal produced by the modulators of red and blue channels 10 and 11, respectively, varies directly with amplitude of the red and blue signals, respectively. This type of operation is described in W.E. Good et al. U.S. Pat. No. 3,290,436, issued Dec. 6, 1966 and assigned to the instant assignee.

Output signals of green channel 12 are furnished to phase splitter 43, and split into two signals which are 180° out of phase with each other. These signals are then algebraically added, respectively, to identical sawtooth voltage waves which are 180° out of phase with each other, respectively, and the composite signals, which are thus 180° out of phase with each other, are applied, respectively to each of the vertical deflection plates, respectively, of the light valve in a manner as shown and described in each of the aforementioned W.E. Good et al. U.S. Pat. Nos. 3,290,436 and 3,325,592 . As a result, the electron beam of the light valve is wobble modulated in the vertical direction as it scans horizontally, producing horizontally directed green diffraction gratings on the deformable medium of the light valve.

The foregoing describes apparatus for maintaining a stable black level for a light valve employing diffraction gratings formed in an optically transparent, light-modulating medium. The apparatus permits the light valve to produce black image elements whenever video signal amplitude is at either black level or blacker-than-black level. The apparatus comprises a light valve video signal process which allows independent, stable control of image brightness, contrast, black video level, and dark field. While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A video signal processor for a light valve including electron beam deflection means, comprising, for each one of a plurality of chromaticity representative signals:

signal-clipping means;

a first clamp circuit coupled to the input of said signal-clipping means and establishing an amplitude reference level so as to control the amplitude level of black video at which clipping by said signal-clipping means occurs;

a second clamp circuit coupled to the output of said signal-clipping means for clamping the output signal of said clipping means to a dark field reference amplitude level;

a constant frequency signal source of unique frequency determined by the color represented by the signal furnished to said signal-clipping means; and amplitude-modulating means responsive jointly to said signal source and said signal-clipping means for amplitude modulating the signal produced by said signal source with the signal produced by said clipping means.

2. The video signal processor of claim 1 including adder circuitry coupled to said amplitude-modulating means for first and second ones of said plurality of chromaticity representative signals, first phase-splitting means coupling the output of said adder circuitry to a first portion of said electron beam deflection means, and second phase-splitting means coupling the output of said signal-clipping means for a third one of said plurality of chromaticity representative signals to a second portion of said electron beam deflection means.

3. The video signal processor of claim 1 including clamp pulse-generating means coupled jointly to said first and second clamp circuits for keying said clamp circuits into operation only during each horizontal blanking interval of the video signal, gating means coupled in parallel with said second clamp circuit, and detector means responsive to a succession of said clamp pulses and rendering said gating means conductive during absence of clamp pulses from said succession of clamp pulses.

4. The video signal processor of claim 1 including brightness pulse-generating means, and adder means for each one of said plurality of chromaticity representative signals, respectively, coupled to said brightness pulse-generating means for algebraically adding the amplitude of said brightness pulse to the respective chromaticity representative signal so as to select the level of clipping which provides optimum contrast in the image produced by the light valve.

5. The video signal processor of claim 2 including brightness pulse-generating means and additional adder circuitry for each one of said plurality of chromaticity representative signals, respectively, coupled to said brightness pulse-generating means for algebraically adding the amplitude of said brightness pulse to the respective chromaticity representative signal so as to select the level of clipping which provides optimum contrast in the image produced by the light valve.

* * * * *